R. HAGEN.
PNEUMATIC TUBE VULCANIZER.
APPLICATION FILED JULY 30, 1917.
1,252,106.
Patented Jan. 1, 1918.
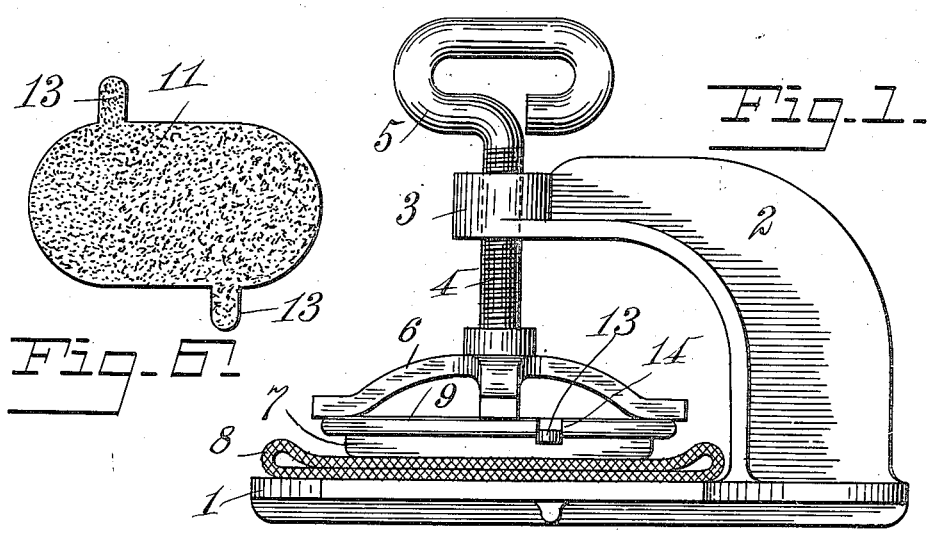
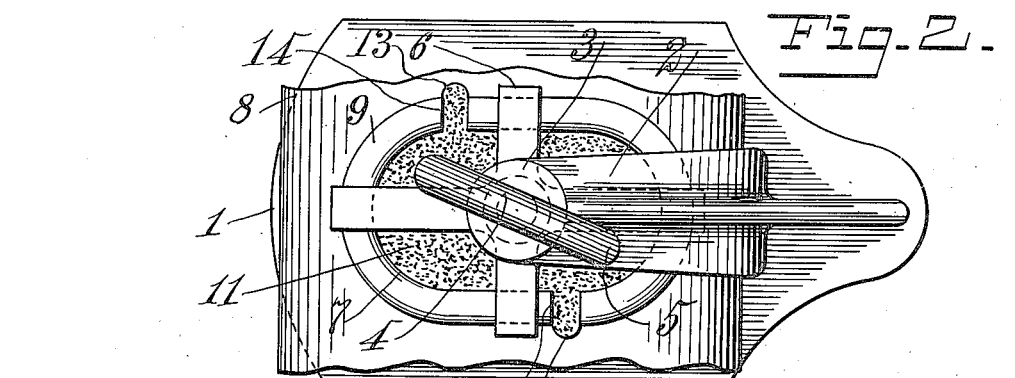
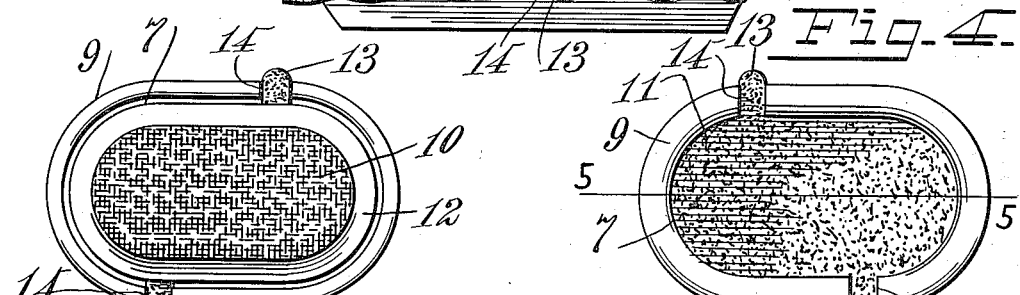
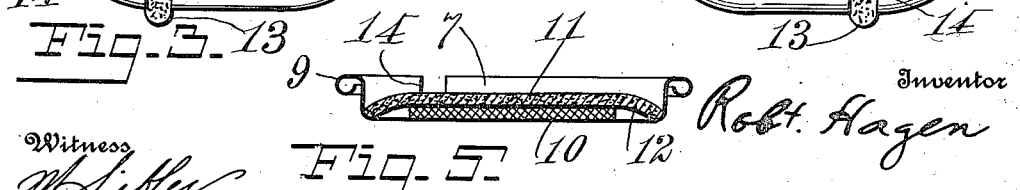
Inventor
Robt. Hagen
By R. J. McCarty
his Attorney

UNITED STATES PATENT OFFICE.

ROBERT HAGEN, OF DAYTON, OHIO.

PNEUMATIC-TUBE VULCANIZER.

1,252,106. Specification of Letters Patent. Patented Jan. 1, 1918.

Application filed July 30, 1917. Serial No. 183,395.

*To all whom it may concern:*

Be it known that I, ROBERT HAGEN, a citizen of the United States, residing at Dayton, in the county of Montgomery and State of Ohio, have invented certain new and useful Improvements in Pneumatic-Tube Vulcanizers, of which the following is a specification.

My invention relates to certain new and useful improvements in hand vulcanizers for repairing the pneumatic tubes of automobile tires. The invention relates specifically to the receptacle, and the inflammable pad contained therein which furnishes the heat for vulcanizing the patch. The object of the invention is to provide an efficient hand vulcanizer having the characteristics hereinafter described and claimed.

In the accompanying drawings Figure 1 is a side elevation of the hand vulcanizer having my improvements applied. Fig. 2 is a top plan view of Fig. 1. Fig. 3 is an inverted or bottom plan view of the pan which holds the inflammable pad. Fig. 4 is a top plan view of the same, and Fig. 5 is a sectional view on the line 5—5 of Fig. 4.

I will first describe the structural parts of a clamp in connection with which my improved heat generating medium may be utilized. The clamp device consists of a base portion 1 forming a flat, table-like portion upon which the tube to be repaired is held, and an overhanging arm 2 which rises from the edge of the table 1 and has an apertured terminal 3 which is screw threaded to receive the screw-threaded portion of a screw 4. The screw 4 terminates in a suitable handle 5 by means of which it is operated to clamp the tube in position. The screw 4 has a threaded engagement with a spider or clamping frame consisting of a series of arms 6. These arms engage the margin 9 of a pan 7. The pan 7 is of oblong or oval shape and the marginal edge 9 thereof is crimped or beaded to provide the requisite strength. The bottom 12 of the pan 7 extends upwardly in convexed form, as shown in Fig. 5, and to the lower surface thereof is applied a patch 10 which is to be vulcanized or united to the surface of the tube 8 in mending a puncture. The patch 10 is adhered to the other side of the bottom 12 sufficiently to maintain it in position until vulcanized to the rubber tube. Over the inner side of the bottom 12 a pad 11 is placed. This pad is coated with an inflammable substance such as paraffin and is given an oval form slightly larger than the pan in order that when forced into the pan the edges may bind the pan and the pad be thereby secured in position free from liability of dropping out until consumed. Fig. 5 shows the pad 11 with the edges bent downwardly against the bottom 12 of the pan. From parts of the margin of said pad 11 tongues 13 project laterally, the said tongues being parts of the pad. These tongues project through marginal openings 14 in the rim of the pan and by means thereof the inflammable pad may be quickly ignited by touching a lighted match thereto. With the vulcanizer outfit a given number of the pans 7 are provided including the pads 11 and the patches 10 ready for the operation of vulcanizing. The pans are constructed of tin and in practice it has been found that ordinary straw-board is suitable for the construction of the pads 11 which are stamped therefrom, the straw-board being previously treated with the coating of inflammable substance.

Having described my invention, I claim:

1. In a device of the character specified, a vulcanizing element comprising a shallow receptacle provided with a concavo-convex bottom and the margin of which is provided with an opening, an inflammable pad secured within the receptacle against the bottom thereof by being formed of slightly larger area than the bottom of said receptacle and forced therein, said inflammable pad having a portion extended from the margin thereof in the form of a tongue which penetrates the opening in the margin of the receptacle, and a patch piece secured to the outer side of the bottom of said receptacle, substantially as specified.

2. In a device of the character specified, a heat-generating element comprising a shallow oval receptacle having a concavo-convex bottom to the inner side of which an inflammable pad is secured, and to the outer side of which a patch to be applied is secured, said inflammable pad having marginal extensions which project through openings in the margin of the receptacle by means of which the inflammable pad is ignited.

In testimony whereof I affix my signature.

ROBERT HAGEN.